US009258742B1

(12) United States Patent
Pianigiani et al.

(10) Patent No.: US 9,258,742 B1
(45) Date of Patent: Feb. 9, 2016

(54) POLICY-DIRECTED VALUE-ADDED SERVICES CHAINING

(71) Applicant: Juniper Networks, Inc., Sunnyvale, CA (US)

(72) Inventors: Jacopo Pianigiani, Cerveteri (IT); Rahul Suhas Vaidya, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 131 days.

(21) Appl. No.: 14/042,499

(22) Filed: Sep. 30, 2013

(51) Int. Cl.
*H04W 28/12* (2009.01)

(52) U.S. Cl.
CPC .................................... *H04W 28/12* (2013.01)

(58) Field of Classification Search
CPC ...... H04W 12/06; H04W 84/12; H04W 88/08
See application file for complete search history.

(56) References Cited

U.S. PATENT DOCUMENTS

| 7,092,397 | B1 | 8/2006 | Chandran et al. |
| 7,184,437 | B1 | 2/2007 | Cole et al. |
| 7,215,637 | B1 | 5/2007 | Ferguson et al. |
| 7,376,718 | B2 | 5/2008 | Gould et al. |
| 7,697,429 | B2 | 4/2010 | Godlewski |
| 7,894,445 | B2 | 2/2011 | Godas et al. |
| 7,948,883 | B1 | 5/2011 | Croft, Jr. et al. |
| 7,990,993 | B1 | 8/2011 | Ghosh et al. |
| 8,023,478 | B2 * | 9/2011 | Cam-Winget et al. ........ 370/338 |
| 8,050,559 | B2 | 11/2011 | Sindhu |
| 8,806,058 | B1 | 8/2014 | Mackie et al. |
| 8,995,305 | B2 * | 3/2015 | Shaik et al. .................... 370/259 |
| 2008/0044181 | A1 | 2/2008 | Sindhu |
| 2011/0113146 | A1 | 5/2011 | Li et al. |
| 2014/0269293 | A1 | 9/2014 | Patrick et al. |

OTHER PUBLICATIONS

"3GPP TS 29.212—Policy and Charging Control (PCC); Reference Points (Release 11)," Version 11.7.0, Feb. 2012, 196 pp.
"3GPP TS 23.203—Policy and Charging Control Architecture (Release 10)" Version 10.1.0, 3rd Generation Partnership Project, Technical Specification Group Services and System Aspects, Sep. 2010, 132 pp.
Cablelabs et. al, Data-Over-Cable Service Interface Specifications, DOCSIS 1.1, Operations Support System Interface Specification, SP-OSSI-v1.1, Cable Television Laboratories, Inc., Louisville, CO., Mar. 12, 2003, 70 pp.

(Continued)

*Primary Examiner* — Chandrahas Patel
(74) *Attorney, Agent, or Firm* — Shumaker & Sieffert, P.A.

(57) ABSTRACT

In general, techniques are described for leveraging at least one of a policy control and charging or application detection architecture for an access network to dynamically control value-added services applied to packet flows. In some examples, a policy enforcement device receives a policy rule that defines at least one of policy control and application detection by an access network for a subscriber device. The policy rule includes a service chain identifier that identifies a service chain that defines one or more value-added services to be applied in a particular order to provide a composite service for application to packet flows associated to the service chain. The policy enforcement device receives a packet sourced by the subscriber device and destined to the packet data network, applies the policy rule to the packet to associate the packet to the service chain, and forwards the packet according to the service chain.

19 Claims, 9 Drawing Sheets

(56) References Cited

OTHER PUBLICATIONS

Cablelabs et. al, Data-Over-Cable Service Interface Specifications, DOCSIS 3.0, MAC and Upper Layer Protocols Interface Specification, CM-SP-MULPIv3.0, Cable Television Laboratories, Inc., Louisville, Co., Aug. 3, 2007, 69 pp.
U.S. Appl. No. 14/042,685, by Jerome P. Moisand, filed Sep. 30, 2013.
U.S. Appl. No. 13/843,500, by Harshad Bhaskar Nakil, filed Mar. 15, 2013.
U.S. Appl. No. 13/842,453, by James M. Murphy, filed Mar. 15, 2013.
U.S. Appl. No. 14/037,130, by Andrew J. Smith, filed Sep. 25, 2013.
Office Action from U.S. Appl. No. 14/037,130, dated Apr. 30, 2015, 13 pp.
"Service Chaining," Juniper Networks, Sep. 16, 2013, retrieved from http://juniper.net/techpupbs/en_US/contrail1.0/topics/task/configuration/service-chaining-vinc.html, 3 pp.
"Enabling Service Chaining on Cisco Nexus 1000V Series Introduction White Paper," Cisco, Sep. 27, 2012, retrieved from http://www.cisco.com/c/en/us/products/collateral/switches/nexus-1000v-switch-vmware-vsphere/white_paper-C11-716028.pdf, 25 pp.
Fernando, et al., "Virtual Topologies for Service Chaining in BGP/IP MPLS VPNs," draft-rfernando-I3vpn-service-chaining-03, Oct. 18, 2013, 15 pp.
Kompella, et al., "Signaling Virtual Machine Activity to the Network Virtualization Edge," draft-kompella-nvo3-server2nve-02, Network Working Group, Apr. 29, 2013, 19 pp.
Patel, et al., "BGP vector routing," draft-patel-raszuk-bgp-vector-routing-03, Network Working Group, Apr. 21, 2014, 12 pp.
Rosen, "BGP/MPLS IP Virtual Private Networks (VPNs)," Network Working Group, RFC 4364, Feb. 2006, 47 pp.
Final Office Action from U.S. Appl. No. 14/037,130, dated Sep. 15, 2015, 15 pp.

* cited by examiner

POLICY-DIRECTED VALUE-ADDED SERVICES CHAINING

TECHNICAL FIELD

The disclosure relates to computer networks and, more specifically, to applying network services to subscriber data traffic traversing computer networks.

BACKGROUND

A cellular radio access network is a collection of cells that each includes at least one base station capable of transmitting and relaying signals to subscribers' wireless devices. A "cell" generally denotes a distinct area of a mobile network that utilizes a particular frequency or range of frequencies for transmission of data. A typical base station is a tower to which are affixed a number of antennas that transmit and receive the data over the particular frequency. Wireless devices, such as cellular or mobile phones, smart phones, camera phones, personal digital assistants (PDAs) and laptop computers, may initiate or otherwise transmit a signal at the designated frequency to the base station to initiate a call or data session and begin transmitting data.

Mobile access networks convert cellular signals, e.g., Time Division Multiple Access (TDMA) signals, Orthogonal Frequency-Division Multiplexing (OFDM) signals or Code Division Multiple Access (CDMA) signals, received at a base station from wireless devices into Internet protocol (IP) packets for transmission within packet-based networks. A number of standards have been proposed to facilitate this conversion and transmission of cellular signals to IP packets, such as a general packet radio service (GPRS) standardized by the Global System for Mobile Communications (GSM) Association, an evolution of UMTS referred to as Long Term Evolution (LTE), mobile IP standardized by the Internet Engineering Task Force (IETF), as well as other standards proposed by the $3^{rd}$ Generation Partnership Project (3GPP), $3^{rd}$ Generation Partnership Project 2 (3GGP/2) and the Worldwide Interoperability for Microwave Access (WiMAX) forum.

A typical 3GPP mobile access network, or "mobile network," includes a core packet-switched network, a transport network, and one or more radio access networks. The core packet-switched network for the mobile network establishes logical connections, known as bearers, among the many service nodes on a path between a wireless device, attached to one of the radio access networks, and a packet data network (PDN). The service nodes then utilize the bearers to transport subscriber traffic exchanged between the wireless device and the PDN, which may include, for example, the Internet, an enterprise intranet, a layer 3 VPN, and a service provider's private network. Various PDNs provide a variety of packet-based data services to wireless devices to enable the wireless devices to exchange service data with application or other servers of the PDNs.

The increasing number and bandwidth requirements of services available to mobile devices pressures available mobile network resources. Policy and charging control (PCC) provides network operators with the means to manage service connections to ensure an efficient utilization of core, transport, and radio network resources. Different services, such as Internet, E-mail, voice, and multimedia, have different quality of service (QoS) requirements that, moreover, may vary by user. To manage service connections in a consistent manner for a mobile network that simultaneously carries multiple different services for multiple users, PCC provides a centralized control to determine an appropriate transport path for services, determine QoS requirements for the services, and determine resource allocation necessary to ensure QoS characteristics of transport paths sufficient to meet the QoS requirements for the various services.

SUMMARY

In general, techniques are described for leveraging at least one of a policy control and charging or application detection architecture for a service provider access network to dynamically control value-added services applied to packet flows by a service provider. In some examples, a service provider may deploy one or more service nodes upstream of the service provider access networks by which subscribers access operator services. In this context, "upstream" refers to a direction of packet flows sourced by and therefore "away from" subscriber devices. The service nodes apply value-added services such as firewall, carrier grade network address translation (CG-NAT), performance enhancement proxies for video, transport control protocol (TCP) optimization and header enrichment, caching, and load balancing. In addition, the service provider may configure service chains that each identify a set of the value-added services to be applied to packet flows mapped to the respective service chains. A service chain, in other words, defines one or more value-added services to be applied in a particular order to provide a composite service for application to packet flows bound to the service chain.

A policy control function executed by a server generates policy rules that substantially conform to a policy control or application detection architecture for the service provider access network. In some examples, the policy control function may extend the policy rules to include a service chain identifier. Policy rules generated in this manner may therefore include, in addition to flow information that identifies associated packet flows for the policy rule and policy and charging control information for the service provider access network, a service chain identifier for a service chain of value-added services applied upstream of the service provider access network. The policy and control function downloads the extended policy rules to an enforcement function executed, e.g., by the access network gateway, which maps packet flows to the extended policy rules and binds mapped traffic flows to the corresponding, identified service chains for the policy rules. As a result, the extended policy rules generated by the policy control function of the server may determine not only policy and charging control in the service provider access network but also the value-added services applied, e.g., in the service provider core network, to packet flows mapped to the extended policy rules. That is, the techniques extend the control of a service provider policy and charging control architecture to permit the service provider to dynamically control the sequence of value-added services applied to packet flows according to a service chain that may span the boundaries of physical network sites and virtualized software appliances in data centers, for example, and is identified and/or defined in a policy definition (e.g. the extended policy rules).

In some examples, the policy and control function may further extend a policy rule to include service chain modification information for tailoring an identified service chain to include a value-added service to the service chain or to exclude a value-added service from the service. In some instances, the service chain modification information may identify a set of value-added services and include, for each of the identified value-added services, additional parameters to tailor packet flow processing. Such additional parameters may include, for instance, a location of a value-added service node for the identified value-added service, information to be transferred from the enforcement function to the value-added service node, charging information, and subscriber-specific processing information for tailoring the application of the identified value-added service to one or more packet flows associated with one or more subscribers. The service chain modification information may in some cases further include terminal data usable by the value-added service node that terminates a service chain to bind downlink flows (directed to a subscriber device) to the service chain.

In one aspect, a method includes receiving, by a policy enforcement device for an access network by which a subscriber device accesses a packet data network, a policy rule that defines at least one of policy control and application detection by the policy enforcement device for the subscriber device, wherein the policy rule includes a service chain identifier that identifies a service chain that defines one or more value-added services to be applied in a particular order to provide a composite service for application to packet flows associated to the service chain. The method also includes receiving, by the policy enforcement device, a packet sourced by the subscriber device and destined to the packet data network. The method further includes applying, by the policy enforcement device, the policy rule to the packet to associate the packet to the service chain identified by the service chain identifier. The method also includes forwarding, by the policy enforcement device and based at least on the association of the packet to the service chain identified by the service chain identifier, the packet toward the packet data network according to the service chain identified by the service chain identifier.

In another aspect, a method includes generating, by a policy control server, a policy rule that defines at least one of policy control and application detection by an access network for a subscriber device, wherein the policy rule includes a service chain identifier that identifies a service chain that defines one or more value-added services to be applied in a particular order to provide a composite service for application to packet flows associated to the service chain. The method also includes sending the policy rule from the policy control server to a policy enforcement device for the access network.

In another aspect, a policy enforcement device for an access network that provides connectivity to a subscriber device to access a packet data network includes a control unit comprising a processor and a policy enforcement module executed by the control unit and configured to receive a policy rule that defines at least one of policy control and application detection by the access network for the subscriber device, wherein the policy rule includes a service chain identifier that identifies a service chain that defines one or more value-added services to be applied in a particular order to provide a composite service for application to packet flows associated to the service chain. The policy enforcement device also includes a network interface to receive a packet sourced by the subscriber device and destined to the packet data network, wherein the policy enforcement module is configured to apply the policy rule to the packet to associate the packet to the service chain identified by the service chain identifier, and wherein the policy enforcement device is configured to forward, based at least on the association of the packet to the service chain identified by the service chain identifier, the packet toward the packet data network according to the service chain identified by the service chain identifier.

In another aspect, a policy control server includes a control unit comprising a processor and a rule module executed by the control unit and configured to generate, for a subscriber device, a policy rule that defines at least one of policy control and application detection by an access network for a subscriber device, wherein the access network provides connectivity for the subscriber device to access a packet data network, wherein the policy rule includes a service chain identifier that identifies a service chain that defines one or more value-added services to be applied in a particular order to provide a composite service for application to packet flows associated to the service chain. The policy control server also includes a network interface card configured to send the policy rule to a gateway device of the access network.

The details of one or more embodiments are set forth in the accompanying drawings and the description below. Other features, objects, and advantages will be apparent from the description and drawings, and from the claims.

BRIEF DESCRIPTION OF DRAWINGS

Like reference characters denote like elements throughout the figures and text.

DETAILED DESCRIPTION

Figure 1A:
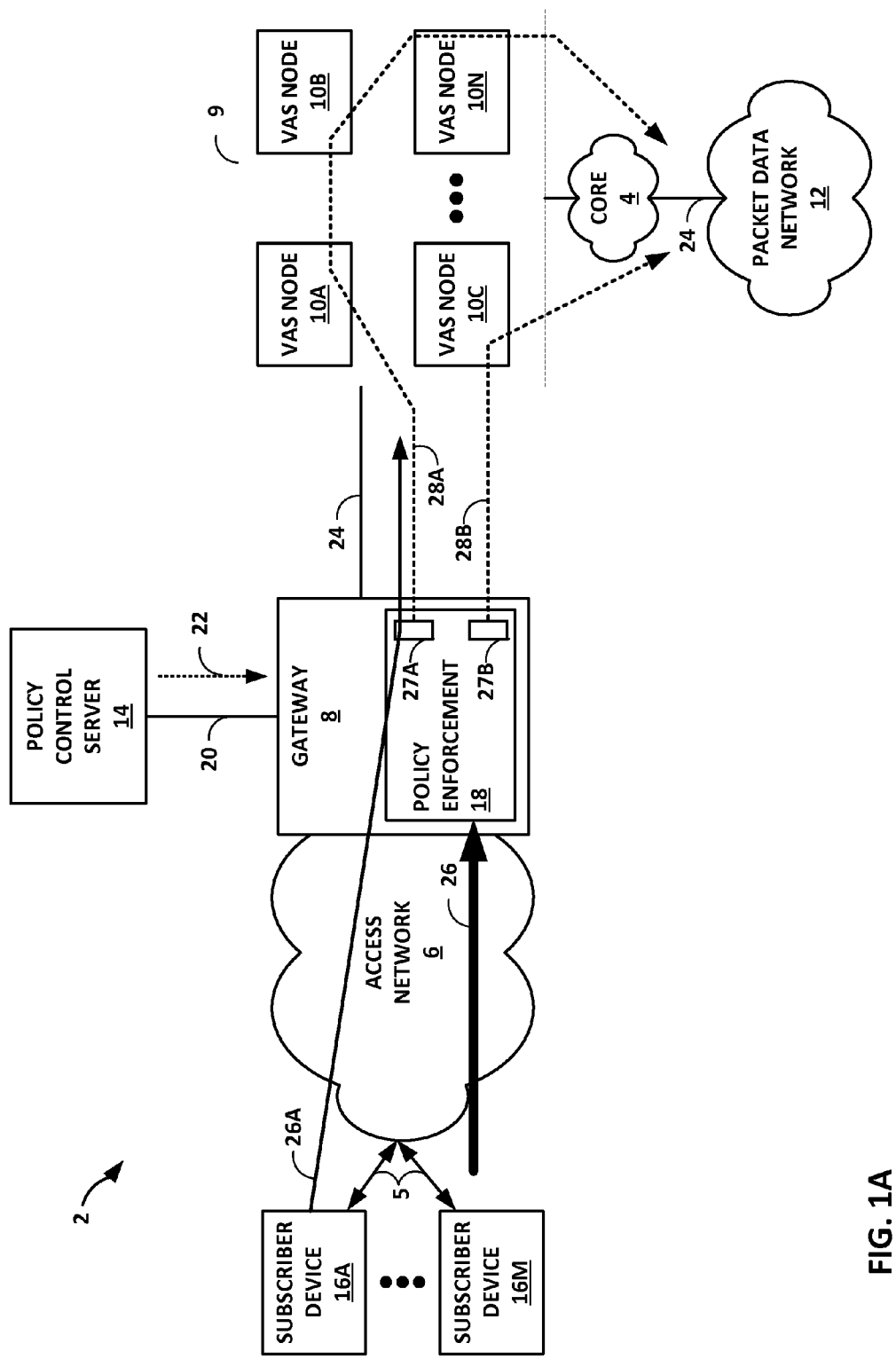
FIGS. 1A-1B are block diagrams illustrating an example network system having value-added services nodes positioned upstream from an access network to apply value-added services according to techniques described in this disclosure.
Figure 1B:
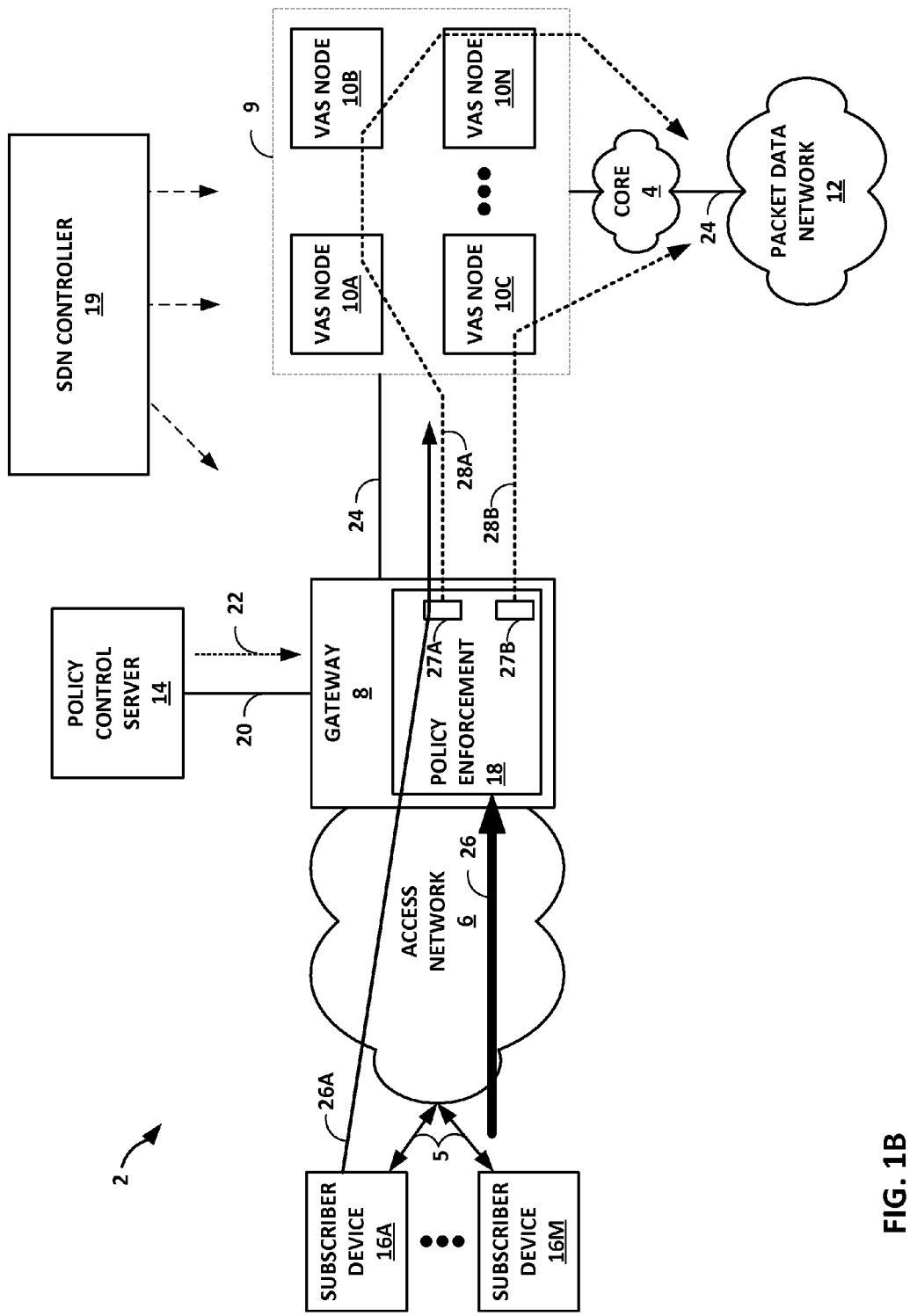

FIGS. 1A-1B are block diagrams illustrating an example network system 2 having value-added services (VAS) nodes 10A-10N (collectively, "VAS nodes 10") positioned upstream from an access network 6 to apply value-added services according to techniques described in this disclosure. Network system 2 includes packet data network (PDN) 12 coupled to service provider access network 6 ("access network 6") via access network gateway device 8 ("gateway 8") for access network 6. Packet data network 12 supports one or more packet-based services that are available for request and use by subscriber devices 16A-16M (collectively, "subscriber devices 16"). As examples, PDN 12 may provide, for example, bulk data delivery, voice over Internet protocol (VoIP), Internet Protocol television (IPTV), Short Messaging Service (SMS), Wireless Application Protocol (WAP) service, or customer-specific application services. Packet data network 12 may comprise, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates access network 6, an enterprise IP network, or some combination thereof. In various embodiments, PDN 12 is connected to a public WAN, the Internet, or to other networks. Packet data network 12 executes one or more packet data protocols (PDPs), such as IP (IPv4 and/or IPv6), X.25 or Point-to-Point Protocol (PPP), to enable packet-based transport of PDN 12 services.

Subscriber devices 16 connect to gateway 8 via access network 6 to receive connectivity to subscriber services for applications hosted by subscriber devices 16. Applications hosted by subscriber devices 16 may include VoIP clients, video games, videoconferencing, E-mail, and Internet browsers, among others. Each of subscriber devices 16 may represent, for example, a mobile phone, a smart phone, a desktop/laptop computer, a gaming console, a video-conferencing suite, a workstation, a wireless device, a network-ready appliance, a file server, print server, a digital subscriber line (DSL) router, a cable modem, or another device with which to access services provided by PDN 12. A subscriber may represent, for instance, an enterprise, a residential subscriber, or a mobile subscriber. Subscriber devices 16 connect to access network 6 via access links 5 that comprise wired and/or wireless communication link. The term "communication link," as used herein, comprises any form of transport medium, wired or wireless, and can include intermediate nodes such as network devices. Each of access links 5 may comprise, for instance, aspects of an asymmetric DSL network, WiMAX, a T-1 line, an Integrated Service Digital Network (ISDN), wired Ethernet, or a cellular radio link.

A network service provider operates, or in some cases leases, elements of access network 6 to provide packet transport between subscriber devices 16 and gateway 8. Access network 6 represents a network that aggregates data traffic from one or more subscribers for transport to/from core network 4 (illustrated as "core 4" in FIGS. 1A-1B) of the service provider. Access network 6 includes network nodes (not shown) that execute communication protocols to transport control and user data to facilitate communication between subscriber devices 16 and gateway 8. Access network 6 may include a broadband access network, cellular access network, a wireless LAN, a public switched telephone network (PSTN), or other type of access network. Examples of cellular access networks include networks conforming to a Universal Mobile Telecommunications System (UMTS) architecture, an evolution of UMTS referred to as Long Term Evolution (LTE), mobile IP standardized by the Internet Engineering Task Force (IETF), as well as other standards proposed by the $3^{rd}$ Generation Partnership Project (3GPP), $3^{rd}$ Generation Partnership Project 2 (3GGP/2) and the Worldwide Interoperability for Microwave Access (WiMAX) forum.

Service provider core network 4 (hereinafter, "core network 4") offers packet-based connectivity to subscriber devices 16A-16M attached to access network 6 for accessing PDN 12. Core network 4 may represent a public network that is owned and operated by a service provider to interconnect a plurality of networks, which may include access network 6. Core network 4 may implement Multi-Protocol Label Switching (MPLS) forwarding and in such instances may be referred to as an MPLS network or MPLS backbone. In some instances, core network 4 represents a plurality of interconnected autonomous systems, such as the Internet, that offers services from one or more service providers. PDN 12 may represent an edge network coupled to core network 4, e.g., by a customer edge device such as customer edge switch or router. PDN 12 may include a data center.

In examples of network system 2 that include a cellular access network as access network 6, gateway 8 may represent a mobile gateway, for example, a Gateway General Packet Radio Service (GPRS) Serving Node (GGSN), an Access Gateway (aGW), and/or a Packet Data Network (PDN) Gateway (PGW). In examples of network system 2 that include a wireline/broadband access network, gateway 8 may represent a Broadband Services Router (BSR), Broadband Network Gateway (BNG), business provider edge (PE) router, and/or a Broadband Remote Access Server (BRAS), for instance. Interface 24 may represent a Gi and/or SGi interface (or "reference point"). Consequently, elements of core network 4 may be referred to as an SGi-LAN and/or Gi-LAN. In some instances, gateway 8 represents a Traffic Detection Function (TDF) device and policy enforcement module 18 represents the TDF. Either a gateway 8 or a separate TDF device that includes the policy enforcement module 18 may be referred to as a "policy enforcement device."

A network service provider that administers at least parts of network system 2 offers services to subscribers associated with devices, e.g., subscriber devices 16, that access the service provider network. Services offered may include, for example, traditional Internet access, Voice-over-Internet Protocol (VoIP), video and multimedia services, and security services. As described above with respect to access network 6, core network 4 may support multiple types of access network infrastructures that connect to service provider network access gateways to provide access to the offered services. In some instances, network system may include subscriber devices 16 that attach to multiple different access networks 6 having varying architectures yet all coupled by interface 24 to PDN 12.

Gateway 8 is a network device that implements policy and charging control (PCC) functionality for access network 6. Policy control server 14 provisions gateway 8 by policy interface 20 with one or more policy rules that each specifies a set of information enabling the detection of a service data flow and defining policy control, charging, or application detection parameters for application by network elements of access network 6. Policy control server 14 may represent a network device that provides a Policy Control and Charging Rules Function (PCRF) for a mobile (e.g., 3GPP) or convergent instance of access network 6 or, alternatively or in addition, a network device that provides a Policy Decision Point (PDP) for a Broadband Policy Control Framework (BPCF) framework for a broadband/wireline instance of access network 6.

Policy enforcement module 18 (illustrated as "policy enforcement 18") of gateway 8, for example, enforces service flow-based policy and charging control according to the policy rules. Policy enforcement module 18 represents a device, module, component, software library, or combination of the above that applies policy enforcement for access network 6 in accordance with the policy rules provided by policy control server 14. Policy enforcement module 18 may in some instances be executed by a device separate from gateway 8.

Policy interface 20 may represent a Gx and/or Sd interface/reference point. In some instances, the policy rules provided by policy control server 14 to gateway 8 include PCC rules and policy enforcement module 18 represents a Policy and Charging Enforcement Function (PCEF). In some instances, the policy rules may also or alternatively include Application Detection and Control (ADC) rules and policy enforcement module 18 represents a Traffic Detection Function (TDF). In some instances, policy enforcement module may represent a Policy Decision Point for a BPCF framework. Further details regarding policy and charging controls are found in "3GPP TS 23.203—Policy and Charging Control Architecture (Release 10)," Version 10.1.0, 3rd Generation Partnership Project, Technical Specification Group Services and System Aspects, September 2010; and 3GPP TS 29.212—Policy and Charging Control (PCC), Reference Points (Release 11)," Version 11.7.0, February 2012; which are each incorporated herein by reference in their entirety.

Any one or more of subscriber devices 16 may begin sending subscriber data traffic toward core network 4 in order to access and receive services provided by PDN 12, and such packets traverse gateway 8 as part of at least one packet flow. Flows 26 illustrated in FIGS. 1A-1B represent one or more upstream packet flows from any one or more subscriber devices 16 and directed to PDN 12. The term "packet flow," "traffic flow," or simply "flow" refers to a set of packets originating from a particular source device and sent to a particular destination device as part of a communication session between the source and destination device. A flow of packets, in either the upstream (sourced by one of subscriber devices 16) or downstream (destined for one of subscriber devices 16) direction, may be identified by the 5-tuple: <source network address, destination network address, source port, destination port, protocol>. This 5-tuple generally identifies a packet flow to which a received packet corresponds. An n-tuple refers to any n items drawn from the 5-tuple. For example, a 2-tuple for a packet may refer to the combination of <source network address, destination network address> or <source network address, source port> for the packet.

Value-added service (VAS) nodes 10 each apply one or more value-added services such as firewall, carrier grade network address translation (CG-NAT), media optimization, IPSec/VPN, subscriber management, deep packet inspection (DPI), and load balancing of packet flows. Each of VAS nodes 10 in this way represents a VAS instance. VAS nodes 10 may represent separate appliances (e.g., firewall appliance, VPN appliance, and so forth) or servers, components or modules of a single appliance or server, virtual machines executed by one or more servers, or any combination of the above. Although illustrated as part of a value-added services complex 9, which may represent a data center, VAS nodes 10 may, for instance, be coupled by one or more switches or virtual switches of core network 4, may be inline for packet flows 26 from gateway 8 to PDN 12, or any combination of the above. VAS nodes 10 may represent virtual machines orchestrated by a services delivery gateway that implements service chains by sequentially directing packets to the VAS nodes 10 according to the orderings specified by the service chains. In some instances, one or more of VAS nodes 10 may be routers, servers, or appliances configured within the core network 4 topology.

Flows 26 may be processed by VAS nodes 10, logically located on a forwarding path for flows 26 from gateway 8 of access network 6 through core network 4 toward PDN 12, according to service chains configured by the service provider. In the illustrated example, service chain 28A identifies the set of VAS nodes 10A, 10B, and 10N according to the listed ordering. Service chain 28B identifies the set of VAS node 10C. Accordingly, packet flows 26 processed according to service chain 28A follow a service path that traverses VAS nodes 10A, 10B, and finally VAS node 10N as the terminal node for the service chain 28A. A particular VAS node 10 may support multiple service chains. For example, a service chain other than service chains 28A, 28B may identify the set of VAS nodes 10A, 10C. Whereas a "service chain" defines one or more value-added services to be applied in a particular order to provide a composite service for application to packet flows bound to the service chain, a "service tunnel" or "service path" refers to a logical and/or physical path taken by packet flows processed by a service chain along with the forwarding state for forwarding packet flows according to the service chain ordering. A service chain may have multiple possible service tunnels. The arrows denoted as service chains 28A, 28B illustrate respective paths taken by packet flows mapped to the service chains 28A or 28B.

VAS nodes 10 may implement service chains 28A, 28B using internally configured forwarding state that directs packet flow packets along the service chains 28A, 28B for processing according to the identified set of VAS nodes 10. Such forwarding state may specify tunnel interfaces for tunneling between VAS nodes 10 using network tunnels such as IP or Generic Route Encapsulation (GRE) tunnels, or by using VLANs, Multiprotocol Label Switching (MPLS) techniques, and so forth. In some instances, real or virtual switches the connect VAS nodes 10 may be configured to direct packet flow packets to the VAS nodes 10 according to service chains 28A, 28B.

In FIG. 1B, software-defined networking (SDN) controller 19 provides a high-level controller for configuring and managing routing and switching infrastructure of network system 2 (e.g., gateway 8, core network 4, and VAS nodes 10), and in some instances managing deployment of virtual machines within the operating environment of value-added services complex 9. For example, SDN controller 19 may interact with gateway 8 to specify service chain 28A, 28B information. For example, the service chain information provided by SDN controller 19 may specify any combination and ordering of value-added services provided by VAS nodes 10, traffic engineering information (e.g., labels or next hops) for tunneling or otherwise transporting (e.g., MPLS or IP tunnels) packet flows along service paths, rate limits, Type Of Service (TOS) markings or packet classifiers that specify criteria for matching packet flows to a particular service chain 28A, 28B. Further example details of an SDN controller are described in PCT International Patent Application PCT/US13/44378, filed Jun. 5, 2013, the contents of which are incorporated herein by reference.

In accordance with techniques described herein, policy enforcement module 18 includes service chain interfaces, which may represent tunnel interfaces to the corresponding service path. In the illustrated example, service chain interface 27A, 27B are interfaces for respective service chains 28A, 28B, and packets forwarded by policy enforcement module 18 to service interface 27A, for instance, will traverse the corresponding service path for service chain 28A. Each of service chain interfaces 27A, 27B is identifiable by a corresponding service chain identifier. In this respect, a service chain identifier for service interface 27A also identifies the corresponding service chain 28A, for instance.

Policy control server 14 offers dynamic policy control not only over user plane behavior toward packet flows traversing access network 6, but also over the selection and application of VAS nodes 10 to the packet flows traversing interface/reference point 24 between gateway 8 and PDN 12. To implement dynamic policy control with respect to VAS nodes 10 upstream of gateway 8, policy control server 14 generates policy rules that substantially conform to the policy control and/or charging architecture of access network 6 but are extended to include service chain identifiers for service chains 28A, 28B.

In the illustrated example, policy control server 14 generates, for a packet flow 26A of flows 26 that is sourced by subscriber device 16A, a policy rule 22 that includes a service chain identifier of service chain interface 27A for service chain 28A. Policy rule 22 thus includes a service chain identifier for service chain 28A. Policy control server 14 may generate policy rule 22 in response to a directive from an application function (AF) or similar logical entity that offers application dynamic policy control over the application of value-added services by VAS nodes 10. Policy control server 14 may dynamically generate policy rule 22 for subscriber device 16A using information obtained from a subscriber profile repository (SPR) or other logical entity that includes subscriber/subscription related information for the subscriber associated with subscriber device 16A and used for subscription-based policy rules, e.g., policy rule 22 in some instances. The policy control server 14 may also receive information from the policy enforcement module 18 of gateway 8, such as an IPv4/IPv6 address or a subscriber identifier associated with subscriber device 16A for which policy rule 22 is generated.

Policy control server 14 downloads the generated policy rule 22 to policy enforcement module 18. Policy rule 22, as generated by policy control server 14, includes flow information to identify packets of the packet flow 26A sourced by subscriber device 16A. Policy enforcement module 18 uses maps the packet flow 26A to the policy rule 22 using the included flow information. In addition to any access network 6-based policy, charging control, application detection, and/or application control enforcement functions specified by the policy rule 22, policy enforcement module 18 additionally uses the service chain identifier specified by policy rule 22 to bind the packets of the packet flow 26A to service chain 28A. That is, having mapped packet flow 26A to policy rule 22, policy enforcement module 18 queries policy rule 22 to determine the service chain identifier of service chain interface 27A for service chain 28A. Policy enforcement module 18 therefore "binds" the packet flow 26A to service chain 28A by associating the packet flow 26A with the service chain interface 27A for service chain 28A. Because of the binding association, policy enforcement module 18 directs gateway 8 to forward packets of packet flow 26A by service chain interface 27A along the service path for service chain 28A. VAS nodes 10A, 10B, 10N that are defined in the set of VASs for service chain 28A apply the respective VASs to the packets of packet flow 26A. As a result, the extended policy rule 22 generated by the policy control server 14 may determine not only policy and charging control in the access network 6 but also the value-added services applied by VAS nodes 10 to packet flows mapped by policy enforcement module 18 to the extended policy rules.

Figure 2A:
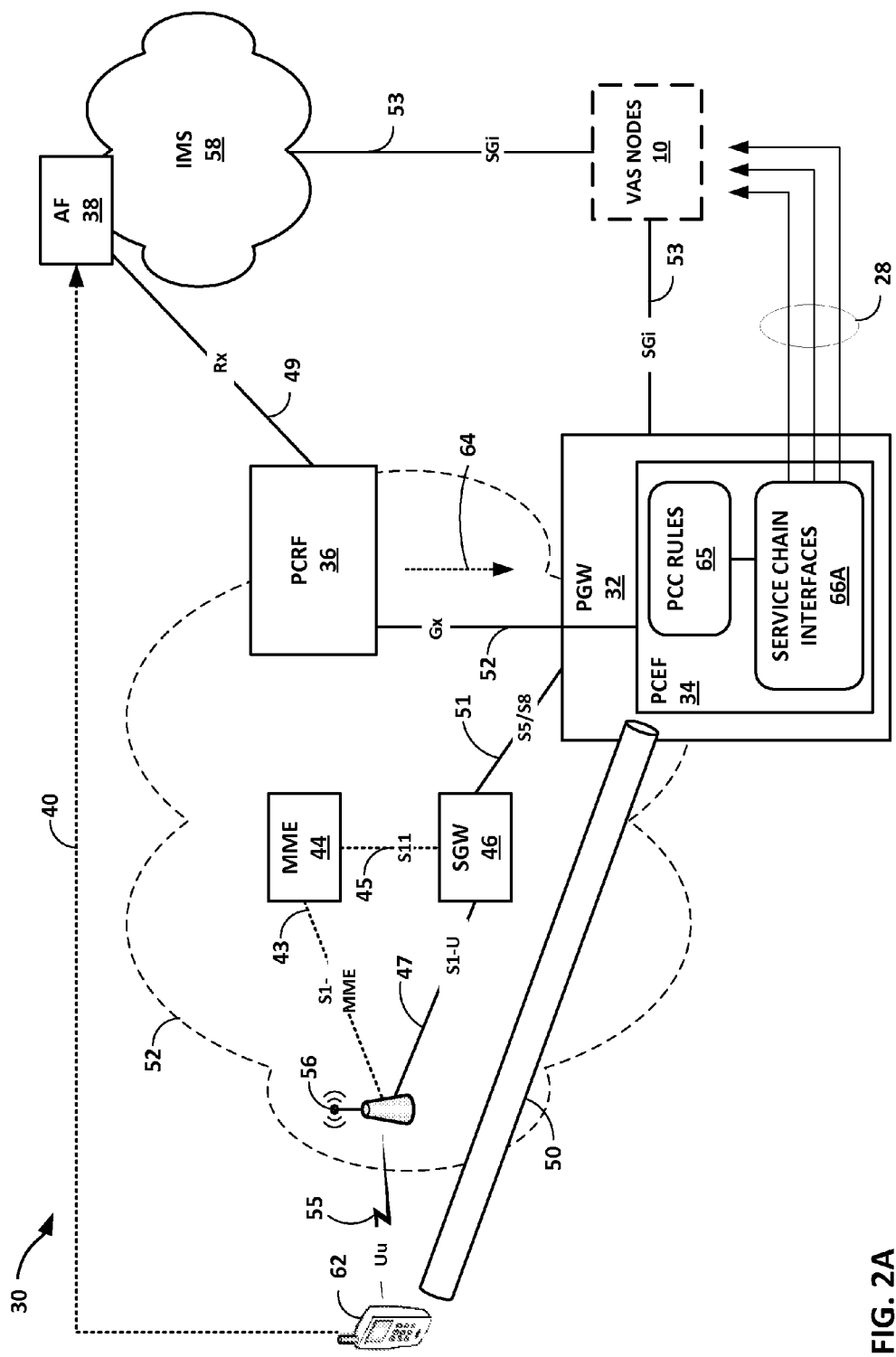
FIGS. 2A-2B are block diagrams illustrating an example network system that extends the control of a policy control and charging architecture to dynamically control the application of value-added services according to techniques described herein.
Figure 2B:
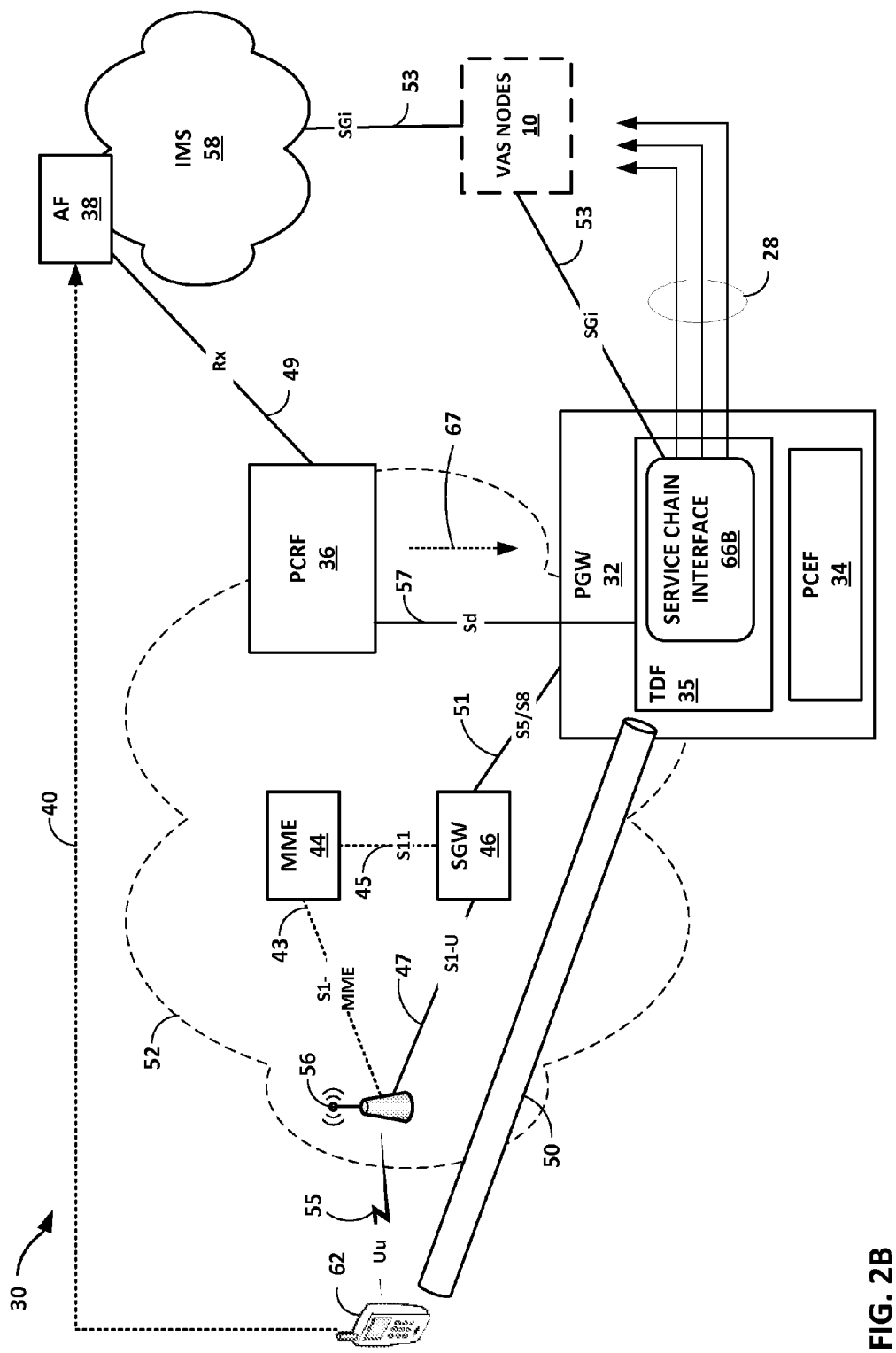

FIGS. 2A-2B are each a block diagram illustrating an example network system 30 that extends the control of a policy control and charging architecture to dynamically control the application of value-added services according to techniques described herein. In these examples, network system 30 includes a Long Term Evolution (LTE) mobile service provider network 52 ("LTE network 52") that includes an Evolved Packet Core (EPC) interfaced to an Evolved UTRAN (E-UTRAN) 23. LTE network 52 enables and transports service data exchanged between wireless device 62 and IMS network 58. LTE network 52 may represent an example instance of access network 6 of FIGS. 1A-1B.

LTE network 52 provides mobility management, session management, and packet routing and transfer for network system 30. The LTE network 52 EPC comprises PDN Gateway 32 ("PGW 32") logically connected to Serving Gateway 46 ("SGW 46") via S5 interface 51 operating over a communication link. PGW 32 hosts packet filtering, lawful interception, PDP address allocation, and other functionality. PGW 32 is an edge router between LTE network 52 and external PDNs, e.g., IMS 36, and hosts lawful interception and PDP address allocation, among other functionality. As described in additional detail below, PGW 32 comprises Policy and Charging Enforcement Function 32 to perform packet gating and filtering.

In some examples, PGW 32 may represent an example instance of gateway 8 of FIG. 1. S5 interface 51 provides protocols to foster user plane tunneling and tunnel management between PGW 32 and SGW 46. S5 interface 51 may comprise a user plane protocol stack that includes GPRS Tunneling Protocol-U(ser Data Plane) (GTP-U) executing over User Datagram Protocol/Internet Protocol (UDP/IP). SGW 46 hosts mobility anchoring, packet routing and forwarding, lawful interception, and other functionality.

The LTE network 52 EPC additionally comprises Mobility Management Entity 44 ("MME 44") logically connected to SGW 46 via S11 interface 45 operating over a communication link. S11 interface 45 provides protocols with which MME 44 establishes and manages bearers that traverse or terminate at SGW 46. S11 interface 45 may comprise a control plane protocol stack that includes GTP-C(ontrol Plane) (GTP-C) executing over UDP/IP. In addition to bearer management and establishment, MME 44 hosts Non-Access Stratum (NAS) signaling, PGW 32 and SGW 46 selection, roaming, and authentication, for instance. In various alternative instances, LTE network 52 may comprise additional MMEs, SGWs, and/or PGWs.

SGW 46 and MME 44 connect to eNode B 56 of an E-UTRAN via respective aspects of an S1 interface. Specifically, SGW 46 logically connects to eNode B 56 via S1-U interface 47 operating over a communication link, and MME 44 logically connects to eNode B 56 via S1-MME interface 43 operating over a communication link to establish bearers over S1-U interface 47 between SGW 46 and eNode B 56. ENode B 56 is communicatively coupled to wireless device 62 via a radio link operating over Uu interface 55.

Wireless device 62, which may represent an example instance of subscriber device 16 of FIGS. 1A-1B, is a User Equipment (UE) that attaches to LTE network 52 to receive services during an attachment session (alternatively referred to as a "subscriber session"; "connectivity access network session" or "CAN session"; or as an "IP-CAN session") identifiable by a combination of a wireless device 62 PDP address and an IMS 58 APN. Applications executing on wireless device 62 issue resource requests 40 to application function 38 to initiate service sessions for corresponding services. Resource requests 40 are application-layer signaling messages.

Network 20 additionally comprises IP Multimedia Subsystem 58 ("IMS 58"), an operator service that the operator of LTE network 52 may use to provide services using, for example, the Session Initiation Protocol (SIP). IMS 58 may represent an example instance of PDN 12 of FIGS. 1A-1B. In some instances, IMS 36 represents one or more other instances of the services layer that provides services to devices, including wireless devices, attached to connectivity access networks, such as LTE network 52. For example, IMS 58 may represent non-IMS based operator services operating according to other standard or proprietary protocols. As another example, IMS 58 may represent services not provided by the operator of LTE network 52 and instead provided, for instance, via the Internet or another packet data network.

IMS 36 comprises application function 38 ("AF 38"), an IMS 58 element that offers applications requiring dynamic policy and/or charging with control over service data traffic that traverses LTE network 52. Application function 38 is communicatively coupled to Policy Control and Charging Rules Function entity 24 ("PCRF 36") via Rx interface 49. Application function 38 receives resource requests 40, which each comprise a request for a different service session, such as an IMS voice call, from wireless device 62. Application function 38 extracts service session description information from resource requests 40 and provides service session description information, such as Session Description Protocol (SDP) parameters, to PCRF 36 in service session description messages sent using Rx interface 49. A service session may be alternatively referred to as an AF session or application session. A subscriber session may be associated with multiple service sessions.

PCRF 36 provides network control for LTE network 52 by way of service data flow (SDF) detection, QoS, gating and packet flow-based charging. PCRF 36 receives service session description information for service sessions in service session description messages received using Rx interface 49, calculates the proper QoS authorization, and generates new (and/or modifies existing) PCC rules that determine treatment of matching service data flows in Policy and Charging Enforcement Function entity 34 ("PCEF 34") and other components of LTE network 52. PCRF 36 installs the new (and/or modified) PCC rules for service sessions to PCEF 34 using PCC rule installation messages sent over Gx interface 52, a reference point between PCRF 36 and PCEF 34 that enables signaling of PCC rules. Gx interface 52 may include a protocol stack that includes, for example, Remote Authentication Dial-In User Service (RADIUS) or Diameter. Accordingly, PCC installation rules may include a Charging-Rule-Install attribute-value pair (AVP) that specifies a Charging-Rule-Definition AVP.

PCRF 36 may for instance be implemented by a router or server and, in various embodiments, LTE network 52 may comprise multiple PCRFs interconnected to multiple PGWs. In some instances, PCRF 36 receives service session information from PCEF 34, a Subscription Profile Repository (SPR), or a Bearer Binding and Event Reporting Function (BBERF) entity in addition to, or instead of, from AF 38.

In the example of FIG. 2A, PCEF 34 is a packet management entity of PGW 32 that performs service data flow detection, policy enforcement and flow based charging according to PCC rules 65 received in some instances from PCRF 36. PCEF 34 receives dynamic PCC rules generated by PCRF 36, according to techniques described in this disclosure, for service sessions in PCC rule installation messages 54 via Gx interface 52. A PCC rule includes a rule identifier that uniquely identifies the rule within a subscriber session, service data flow detection information, charging information, and/or policy control information. In accordance with the described techniques, a generated PCC rule may also include a service chain identifier for one of service chain interfaces 66A to service chains corresponding to service paths that traverse SGi interface 53.

Policy control information specifies parameters for gating control (i.e., permit/deny), Quality of Service (QoS) control, and QoS signaling, for example. Service data flow detection information includes a service data flow template that specifies traffic mapping information to identify packet flows for a service session. Traffic mapping information may include one or more packet filters that include parameters that characterize packet flows according to, for example, the IP 5-tuple consisting of the source address, destination address, source port, destination port, and transport protocol specified in IP packet headers, other packet header information, and/or information obtained from Deep-Packet Inspection (DPI). The set of packets detected by applying the service data flow template of a particular PCC rule are referred to as a service data flow. A service data flow may include packets for multiple service sessions.

PCEF 34 associates service data flows (and, by extension, the corresponding PCC rule) to particular bearers for a subscriber session during a binding process to ensure that packet flows within the service data flows receive an appropriate QoS from LTE network 52. For a given PCC rule from PCC rules 65, PCEF 34 analyzes policy control information therein to determine whether an existing bearer for the relevant subscriber session is sufficient to provide the requisite QoS. If not, PCEF 34 initiates establishment of a new, suitable bearer. PCEF 34 creates bindings between (or "binds") one or more service data flows and the bearer that matches the QoS specified in corresponding PCC rules for the service data flows. A particular bearer established to provide a particular QoS scheme may thus carry packet flows matched by one or more PCC rules.

Upon receiving new PCC rules for corresponding service sessions, PCEF 34 initiates establishment of new bearers, or modification or utilization of existing bearers and binds the bearers to the PCC rules. As a result, PCEF 34 causes PGW 32 to apply policy control and charging to upstream packets that match service data flow templates of any of the PCC rules using the respective bearer to which the PCC rule is bound. PCEF 34 may bind multiple PCC rules to a single bearer.

In the illustrated embodiment, upon receiving an extended PCC rule in PCC rule installation messages 64, PCEF 34 initiates establishment, within LTE network 52, of bearer 50 for the wireless device 62 subscriber session for transporting session data flows between the wireless device 62 and IMS 36 by way of PGW 32. PCEF 34 may install the PCC rule to PCC rules 65. Bearer 50 operates according to distinct QoS parameters, and thus exhibits distinct QoS characteristics. Bearer 50 may comprise, for instance, an Evolved Packet System (EPS) bearer and/or a Radio Access Bearer (RAB). PCEF 34 binds the extended PCC rule to the bearer 50 according to the policy control information specified within the extended PCC rule received in PCC installation message 64.

The extended PCC rule received in PCC installation message 64 for a service session requested by wireless device 62 further includes a service chain identifier for the requested service session. PCEF 34 having bound the extended PCC rule to bearer 50, as described above, applies the service data flow template for the extended PCC rule to packets received via bearer 50. For packets the match the service data flow template for the extended PCC rule, PCEF 34 forwards the matching packets on the SGi interface 53 using a service chain interface from service chain interfaces 66A that is identified by the service chain identifier specified in the extended PCC rule. Service chain interfaces 66A are interfaces to corresponding service chains 28. Thus, for example, the service chain identifier specified in the extended PCC rule may reference, in PCEF 34, a service chain interface from service chain interfaces 66A that is an interface to service chain 28A. PCEF 34 in the above example therefore directs PGW 32 to forward packets, received via bearer 50 and matching the extended PCC rule bound to bearer 50, on SGi interface 53 according to service chain 28A.

By specifying a service chain identifier in an extended PCC rule that substantially conforms to the PCC architecture for LTE network 52, PCRF 36 and PCEF 34 operating according to techniques described above provide application function 38 (and by extension the service provider for network system 30) with the ability to specify a service chain 28 for upstream packets and thus with the ability to dynamically control the set of VAS nodes 10 applied to packets received by PGW 32 and sourced by wireless device 62.

In the example of FIG. 2B, PGW 32 implements a traffic detection function (TDF) 35 to perform application traffic detection and reporting of detected applications' traffic along with a TDF 35 application instance identifier and service data flow descriptions to the PCRF 36 (when the service data flow descriptions are deducible). Like the PCEF 34, TDF 35 receives rules from PCRF 36, known as Application Detection and Control (ADC) rules, which PCRF 36 may provide and activate by Sd reference point 57. TDF 35 applies, to detected application traffic, enforcement actions such as gating, redirection, and bandwidth limiting. In some examples, TDF 35 may be applied by a network device that is separate and distinct from PGW 32. In some examples of network system 30 of FIG. 2B, PGW 32 does not implement PCEF 34.

PCRF 36 generates ADC rules extended in accordance with techniques described herein to include a service chain identifier that identifies one of service chains 28. In the illustrated embodiment, PCRF 36 generates an extended ADC rule for a TDF session for the subscriber session for wireless device 62. The generated ADC rule, in addition to the rule identifier, TDF application identifier, monitoring key, gateway status, uplink/downlink maximum bit rates (MBRs), and redirection information, includes a service chain identifier for one of service chains 28 that define a set of VAS nodes 10 to be applied to packet flows that match the ADC rule.

PCRF 36 installs the extended ADC rule to TDF 35, via Sd interface 57, using ADC installation message 67. ADC installation message 67 may represent an ADC-Rule-Install AVP, for instance. Upon receiving the extended ADC rule included in ADC installation messages 67, TDF 35 applies the extended ADC rule to packets received via bearer 50 for wireless device 62. For packets that match the extended ADC rule, TDF 35 forwards the matching packets on the SGi interface 53 using a service chain interface from service chain interfaces 66B that is identified by the service chain identifier specified in the extended ADC rule. Service chain interfaces 66B are interfaces to corresponding service chains 28. Thus, for example, the service chain identifier specified in the extended ADC rule may reference, in TDF 35, a service chain interface from service chain interfaces 66B that is an interface to service chain 28A. In the above example, TDF 35 therefore directs PGW 32 to forward packets, received via bearer 50 and matching the extended ADC rule, on SGi interface 53 according to service chain 28A.

By specifying a service chain identifier in an extended ADC rule that substantially conforms to the TDF architecture for LTE network 52, PCRF 36 and TDF 35 operating according to techniques described above provide application function 38 (and by extension the service provider for network system 30) with the ability to specify a service chain 28 for upstream packets and thus with the ability to dynamically control the set of VAS nodes 10 applied to packets received by PGW 32 and sourced by wireless device 62.

Figure 3:
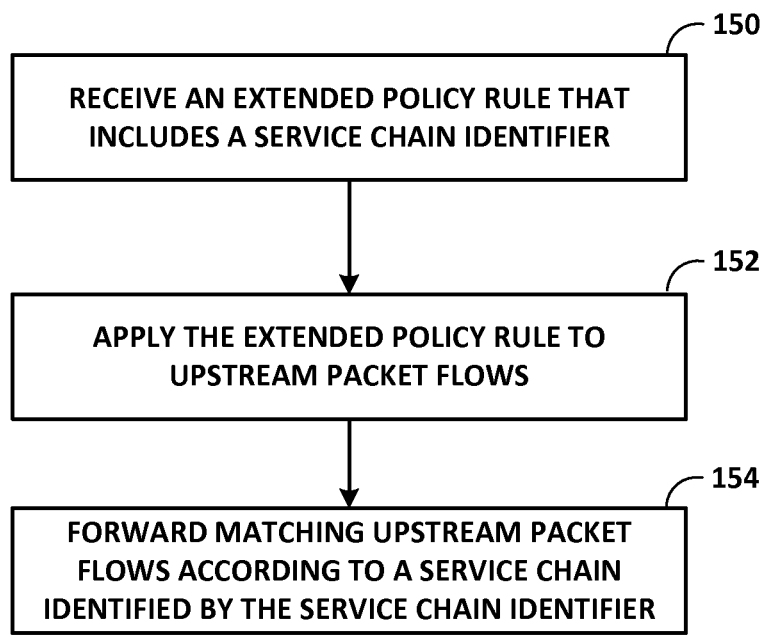
FIG. 3 is a flowchart illustrating an example mode of operation for a gateway that applies policy rules extended according to techniques described in this disclosure.

FIG. 3 is a flowchart illustrating an example mode of operation for a gateway that applies policy rules extended according to techniques described in this disclosure. The example mode of operation is described with respect to gateway 8 of FIG. 1. Gateway 8 receives, from a policy control server 14, an extended policy rule 22 that conforms to a policy control and/or charging architecture and also includes a service chain identifier that identifies a service chain 28A that defines one or more value-added service nodes 10 to be applied in a particular order to provide a composite service for application to packet flows bound to the identified service chain (150). Subsequently, gateway 8 receives upstream packet flows, to which gateway 8 applies the extended policy rule 22 (152). For upstream packet flows that match the extended policy rule 22, gateway 8 forwards the matching upstream packet flows using a service chain interface 27A for the service chain 28A identified by the service chain identifier included in the extended policy rule 22 (154).

Figure 4:
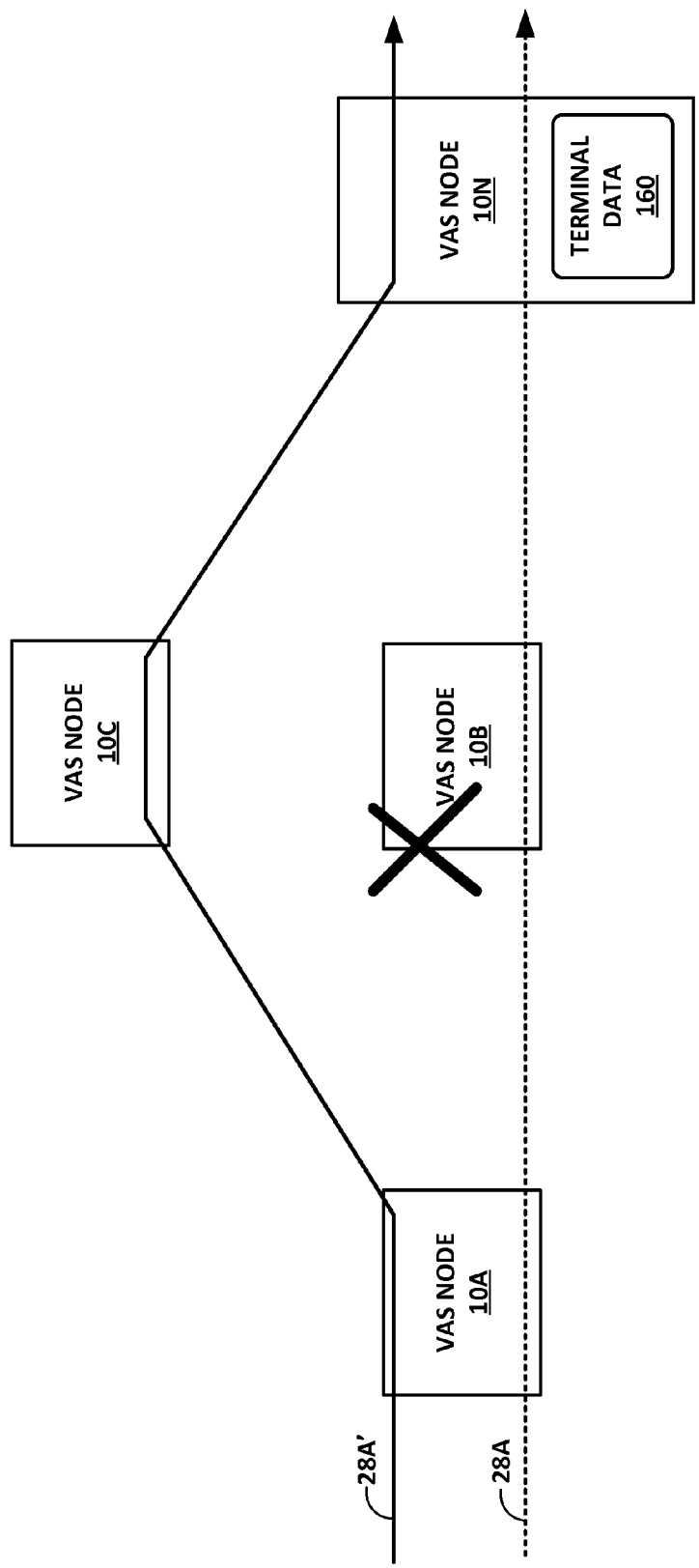
FIG. 4 is a block diagram illustrating a service chain dynamically tailored for one or more flows to modify, in accordance with techniques described in this disclosure, the value-added services applied to one or more flows that match the service chain according to a modified service chain.

FIG. 4 is a block diagram illustrating the service chain 28A of FIGS. 1A-1B dynamically tailored for one or more flows to modify, in accordance with techniques described in this disclosure, the value-added services applied to one or more flows that match the service chain 28A according to a modified service chain 28A'. In this way, the policy control server 14 and policy enforcement module 18 of network system 2 may avoid configuring additional service chains and instead modify existing service chains 28 to exclude and/or include particular value-added services (represented here by VAS nodes 10).

Policy control server 14 may generate policy rule 22 to include a value-added services data structure that, in addition to the service chain identifier described above, refer to one or more value-added services to be included the identified service chain and/or one or more value-added services to be excluded from the identified service chain. The value-added services data structure may include additional information for the referenced value-added services to be included and/or excluded and any other value-added service that is already a value-added service of the identified service chain. The additional information may therefore represent the sequence of value-added services and include additional parameters such as logical locations of the VAS nodes 10 associated with the VASes to be applied; additional information that the enforcement function of the subscriber-aware edge node (e.g., policy enforcement module 18 of gateway 8) is to transfer to the represented VAS nodes 10; charging-related information; and per-subscriber, per-VAS policy information for tailoring VAS nodes 10 to apply subscriber-specific functionality to packets according to the associated subscriber.

Policy control server 14 may further generate the value-added services data structure of policy rule 22 to include terminal data for application by the VAS node 10 that terminates the identified service chain. The terminating VAS node 10 may in some instances associate downlink flows (i.e., entering the service chain in the downlink direction (towards subscriber devices 16 from PDN 12)) in order to bind the downlink flows to a service chain operating in the downlink direction. The terminal data may include, for instance, identifying information for a subscriber flow associated with the policy rule and additional parameters for binding (or removing the binding of, in case of subscriber or flow termination) downlink flows to the identified service chain.

Upon receiving policy rule 22 generated according to any of the above description and sent by policy control server 14 in a message, policy enforcement module 18 binds flows that match the policy rule 22 to the identified service chain. "Bind" as used herein refers to generating an association between a flow and a forwarding path, which may include a service chain, to be used for forwarding packets of the flow. In the example of FIG. 1, the identified service chain is service chain 28A. The value-added services data structure of policy rule 22 additionally refers, in the illustrated example, to VAS node 10B for exclusion and to VAS node 10C for inclusion. Thus, the sequence of VAS nodes 10 for application to flows that match policy rule 22 in this example accord with modified service chain 28A' in sequence VAS nodes 10A, 10C, and 10N.

In some examples, the policy enforcement module 18 (or SDN controller 19 as described with respect to FIG. 1B)

modifies the service tunnel for service chain 28A to conform to modified service chain 28A'. That is, the policy enforcement module 18 may generate transport tunnels from gateway 8 to a device that implements VAS node 10A, from the device that implements VAS node 10A to a device that implements VAS node 10C, and from the device that implements VAS node 10C to a device that implements VAS node 10N. In this way, a packet flow bound to the identified service chain 28A traverses the service tunnel for modified service chain 28A'.

In some examples, VAS nodes 10 implement inclusion and/or exclusion as specified by a value-added services data structure. Policy enforcement module 18 may provide the value-added services data structure to the VAS nodes 10 using out-of-band signaling channels or by providing the data structure in-band on the service tunnel together with the bound packet flows. Each of VAS nodes 10 that receives packets bound to the service tunnel to which the value-added services data structure applies interprets the information therein and takes consistent actions with respect to packet flows, which may include applying the corresponding VAS to the packet flows or passing the packet flows through. Further, each of VAS nodes 10 may pass the value-added services data structure in-band along the service tunnel to allow each VAS node 10 in the service chain to process the flows in the manner indicated by the additional parameters (e.g., charging-related information).

A VAS node 10 may exclude itself from service chain 28A by "passing through" a packet bound to service chain 28A to the next VAS node 10 on the chain. In other words, the VAS node 10 does not apply the corresponding VAS function and instead merely forwards the packet flow. In the example of FIG. 4, VAS node 10B may receive packets bound to service chain 28A and forward the packets to VAS node 10C that is the next VAS node in modified service chain 28A' by virtue of the inclusion of VAS node 10C in the value-added services data structure of policy rule 22.

A VAS node 10 may be included within modified service chain 28A' by operation of policy enforcement module 18, devices that implement VAS nodes 10, and/or SDN controller 19. Any of these devices may independently or cooperatively modify the service tunnel that transports packet flows mapped to service chain identified by the service chain identifier of extended policy rule 22. Alternatively or additionally, VAS nodes 10 may use the value-added services data structure to identify a next VAS node 10 in the service path, which may in some cases be a VAS node 10 that is not defined by the service chain as configured but is, rather, included within the value-added services data structure to tailor the service chain to packet flows that match the extended policy rule 22. For instance, a server may implement VAS nodes 10B and 10C using respective virtual machines. A hypervisor or switch module for the server may determine, from the value-added services data structure of extended policy rule 22, that VAS node 10B should be excluded from service chain 28 and that VAS node 10C should be included.

Accordingly, to implement modified service chain 28A', the server applies VAS node 10C but not VAS node 10B to packets that match the extended policy rule 22. In some examples, any of VAS nodes 10 may make this determination and modify its processing operations to include VAS node 10C and to exclude VAS node 10B from the service path. In some examples, a services delivery gateway orchestrates the operations of VAS nodes 10 representing virtual machines. In such examples, the services delivery gateway may receive the value-added services data structure and, to implement modified service chain 28A', forward matching packet flows to additional VAS nodes 10 (VAS node 10C in the illustrated example) that apply services specified for inclusion by the value-added services data structure and eschew forwarding matching packet flows to VAS nodes 10 in the service chain specified for exclusion (VAS node 10B in the illustrated example).

Each VAS node 10 in a service chain (whether or not modified according to the above description) processes packets that match the extended policy rule 22 using the additional parameters included in the value-added services data structure. VAS nodes 10 may in some cases determine that packets match the extended policy rule 22 because the packets arrive on an interface for the service tunnel for service path 28A.

VAS node 10N as the terminal node for service path 28A (and modified service path 28A') stores, as terminal data 160, the terminal data included in the value-added services data structure generated by policy control server 14 and received by policy enforcement module 18. Terminal data 160 may include identifying information for packet flows associated with the extended policy rule 22 and additional parameters for binding (or removing the binding of, in case of subscriber or flow termination) flows to the identified service chain, e.g., service chain 28A, in the downlink direction. VAS node 10N applies the terminal data 160 to packet flows that enter the service chain 28A (or modified service chain 28A') directed toward subscriber devices 16 (and gateway 8 on the forwarding path toward subscriber devices 16).

Figure 5:
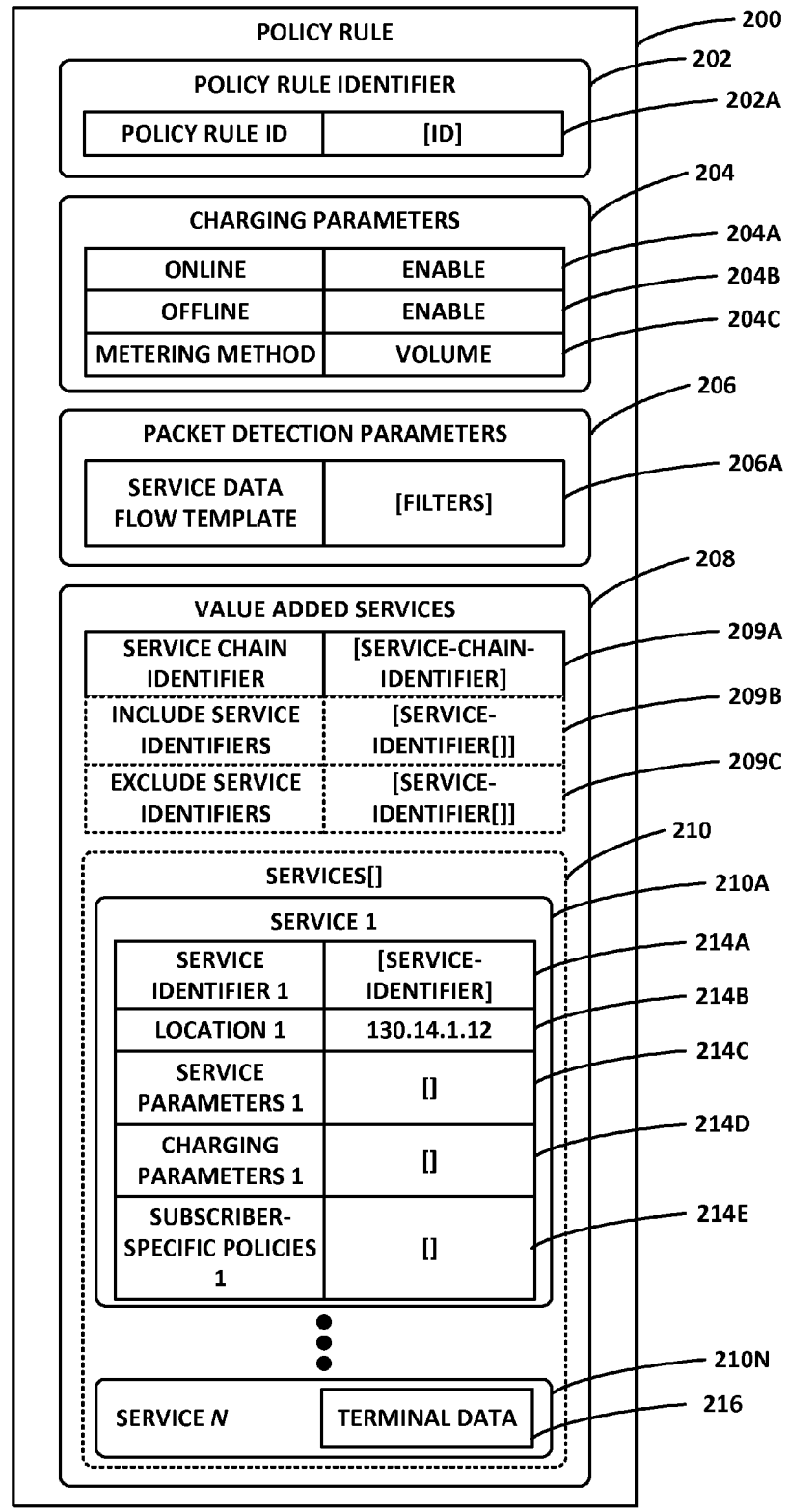
FIG. 5 is a block diagram illustrating an example policy rule extended in accordance with techniques described herein.

FIG. 5 is a block diagram illustrating an example policy rule extended in accordance with techniques described herein. Policy rule 200 may represent an example instance of policy rule 22 of FIGS. 1A-1B. Policy rule 200 may be a policy rule dynamically generated by a policy server, such as a PCRF for a PCC/TDF architecture, a Policy Decision Point (PDP) for a BPCF architecture, or a PCRF for a converged architecture, for a subscriber session or a TDF session for the subscriber session.

Policy rule 200 includes a policy rule identifier section 202, charging parameters section 204, a packet detection parameters section 306, and a value-added services section 208. Value-added services data structure 208 includes a service chain identifier 209A that identifies a value-added services chain upstream of the gateway/enforcement device that applies policy rule 200 to received packets. Service chain identifier 209A may represent an AVP embedded within an AVP for policy rule 200, e.g., a Charging-Rule-Definition AVP; a Type-Length-Value field; or other syntax element that includes a locally significant value for identifying a service chain. The value for service chain identifier 209A may be, e.g., an ASCII string or a bitstring.

Value-added services data structure 208 further includes include service identifiers 209B, a list of zero or more service-identifiers that each specifies a value-added service to be included in the service chain identified by service chain identifier 209A. Value-added services data structure 208 further includes exclude service identifiers 209C, a list of zero or more service-identifiers that each specifies a value-added service to be excluded from the service chain identified by service chain identifier 209A. A service-identifier in either include service identifiers 209B or exclude service identifiers 209C references a service identifier in the services 210 of value-added services data structure 208. Services 210 specifies zero or more service data structure 210A-210N (collectively, "service data structures 210") that each specifies and includes additional parameters for a value-added service. For example, each of service data structures 210 may specify and include additional parameters for application by one of VAS nodes 10 of FIGS. 1A-1B.

Each of service data structures 210 is associated with a different value-added service. Service data structures 210 have similar syntax elements as described hereinafter with respect to service data structure 210A, which includes, in this example policy rule 200, a service identifier referable by include service identifiers 209B and exclude service identifiers 209C, a location 214B of the VAS component (e.g., a network address for a virtual machine or network device) that implements the service, service parameters 214C that specify additional information that the policy enforcement module 18 is to transfer to the VAS node 10 that implements the service in the service chain identified by service chain identifier 209A, charging parameters 214D for charging the service to subscribers, and subscriber-specific policies 214 that specify per-subscriber, per-VAS policy information for tailoring the implementing VAS node 10 to apply subscriber-specific functionality to packets according to the subscription of the subscriber associated with the packets.

Service data structure 210N is a service data structure for a terminal VAS node 10 for the service chain identified by service chain identifier 209A. In addition to the service data structure data described above with respect to service data structure 210A, service data structure 210N includes terminal data 216, which may include identifying information for packet flows associated with the extended policy rule 200 and additional parameters for binding (or removing the binding of, in case of subscriber or flow termination) flows to the service chain identified in service chain identifier 209A in the downlink direction. The terminal VAS node 10 for the service chain applies the terminal data 216 to packet flows that enter the service chain in the downlink direction.

Policy enforcement module 18, VAS nodes 10, and SDN controller 19 may use value-added services data structure 208 to bind matching packet flows to a service chain identified by service chain identifier 209A and optionally to modify the service chain according to parameters included in service data structures 210 and referenced by include service identifiers 209B and exclude service identifiers 209C. As a result, elements of network system 2 may enable a service provider or enterprise to dynamically control the sequence of value-added services applied according to a service chain, irrespective of whether the value-added services are implemented and applied by network components that deployed locally or remotely or using physical or virtualized appliances, and also to tailor the application of the service chain according subscriber, time of day, operator needs, or any other policy input that may affect that application of the value-added services to packet flows that match the extended policy rule 200.

Figure 6:
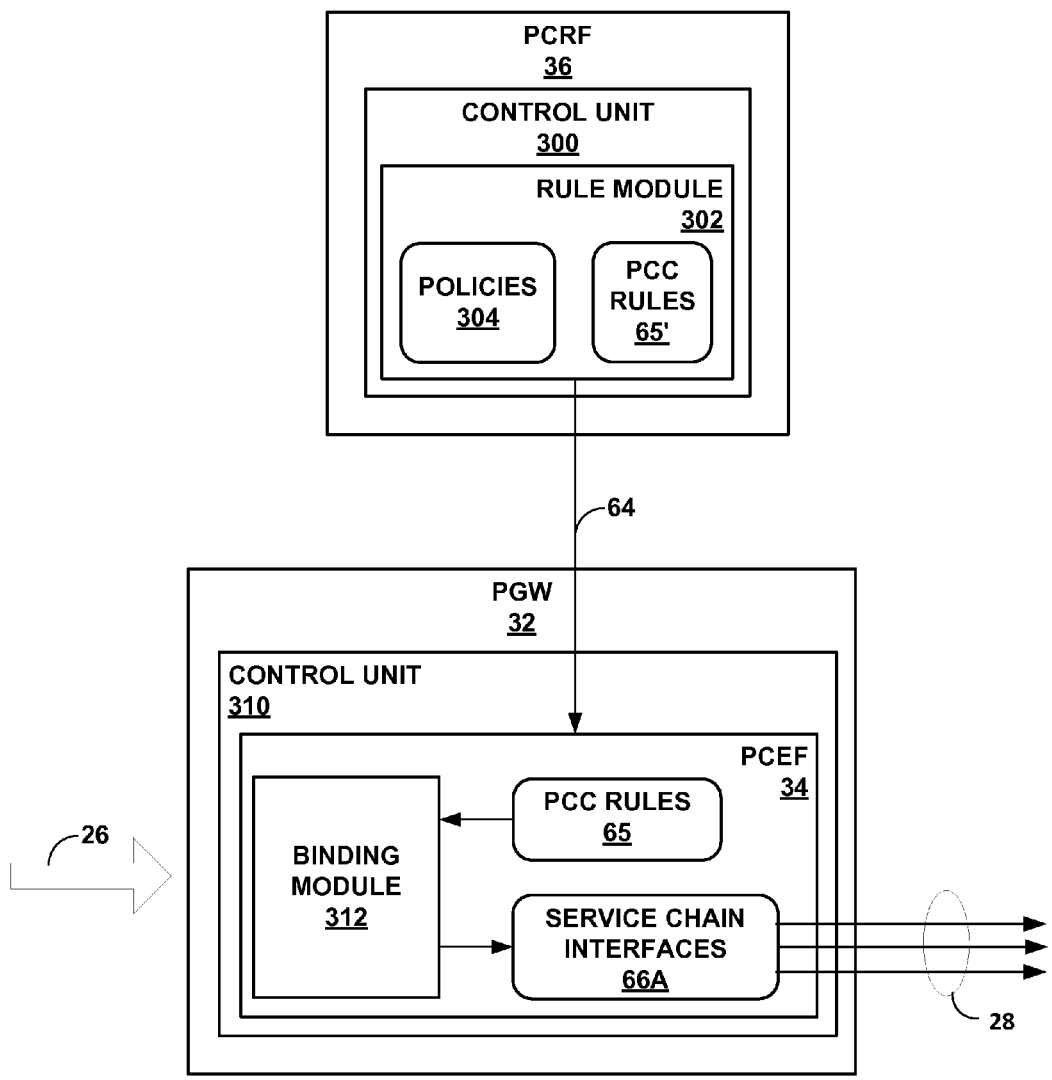
FIG. 6 is a block diagram illustrating example instances of a policy control and rules function device and a packet data network gateway device in further detail.

FIG. 6 is a block diagram illustrating example instances of PCRF 36 ("PCRF 36") and PGW 32 of FIG. 2A in further detail. PCRF 36 and PGW 32 are in this example separate network devices that include respective control units 300 and 310. Each of control units 300 and 310 may include one or more processors or controllers (not shown in FIG. 6) that execute software instructions, such as those used to define a software or computer program, stored to a tangible computer-readable medium (again, not shown in FIG. 6), such as a storage device (e.g., a disk drive, or an optical drive), or memory (such as Flash memory, random access memory or RAM) or any other type of volatile or non-volatile memory, that stores instructions to cause a programmable processor to perform the techniques described herein. Alternatively, or in addition, control units 300 and 310 may each comprise dedicated hardware, such as one or more integrated circuits, one or more Application Specific Integrated Circuits (ASICs), one or more Application Specific Special Processors (AS-SPs), one or more Field Programmable Gate Arrays (FPGAs), or any combination of one or more of the foregoing examples of dedicated hardware. PCRF 36 and PGW 32 also each include one or more network interface cards or other network interface with which to exchange control traffic and, at least in the case of PGW 32, data traffic in the form of packet flows.

Control unit 300 of PCRF 36 provides an operating environment for rule module 302 to dynamically generate extended policy and charging control (PCC) rules 65' and provide the extended PCC rules 65' to PCEF 34 of PGW 32 in accordance with the described techniques. Rule module 302 determines, for various services, the manner in which corresponding service data flows shall be treated with respect to, e.g., QoS and charging by PCEF 34. Rule module 302 performs session binding to generate PCC rules 65' that direct PCEF 34 bearer binding, charging, reporting, credit management, and event triggering. In addition, rule module 302 extends the PCC rule format to generate extended PCC rules 65' that each includes a value-added services data structure that specifies a service chain identifier and, optionally, a set of syntax elements of the value-added services data structure that tailor the identified service chain for packet flows that match the extended PCC rule.

Rule module 302 may dynamically generate extended PCC rules 65' according to policies 304 obtained, e.g., from an SPR or provisioned in PCRF by an administrator. In addition, rule module 302 may dynamically generated extended PCC rules 65' in response to a request by an application function communicating with PCRF 36 by an Rx interface (not shown in FIG. 6).

Rule module 302 issues PCC rule installation messages 64 to PCEF 32 to install at least one of the extended PCC rules 65' to PCEF 34, which stores the extended PCC rules as extended PCC rules 65. Rule module 302 may provide additional PCC rule installation messages 64 to PCEF 32 upon modifications to one or more of PCC rules 65' to ensure PCC rules 65 store up-to-date policy control information and service data flow detection information.

Control unit 310 of PGW 32 provides an operating environment for PCEF 34 (an example instance of policy enforcement module 18 of FIG. 1) to apply PCC rules 65 received from PCRF 36 in PCC rule installation messages 64 to perform bearer binding, charging, reporting, credit management, and event triggering in accordance with techniques described herein. In some embodiments, an operator statically provisions a subset of PCC rules 65 via an administrative interface, such as a remote procedure call or a command-line interface.

PCEF 34 includes one or more service chain interfaces 66A to service chains 28. A binding module 312 binds incoming packet flows 26 to service chains 28 according to service chain interfaces 66A identified by service chain identifiers in extended PCC rules 65. That is, the service chain identifiers in extended PCC rules 65 locally refer, in PCEF 34, to service chain interfaces 66A to service chains 28. IN this way, binding module 312 binds the service data flow template (or similar packet identifying information) for an extended PCC rule 65 to a service chain interface 66A and thereafter forwards packets the match the service data flow template according to the service chain interface 66A.

As described above, an extended PCC rule from extended PCC rules 65 may optionally include a set of syntax elements of the value-added services data structure that tailor the identified service chain for packet flows that match the extended PCC rule. In such cases, PCEF 34 may communicate with VAS nodes 10 using out-of-band signaling channels to modify the service tunnel. PCEF 34 may additionally pass portions of the value-added services data structure in-band with packet flows, according to the bound service chain identified in the extended PCC rule.

Although described and illustrated in FIG. 6 with respect to a PCC architecture, the techniques described above as performed by PCRF 36 and PCEF 34 of PGW 32 may be performed, mutatis mutandis, by elements of a TDF architecture such as a PCRF 36 and a TDF 35 of PGW 32 (as described with respect to FIG. 2B) or by elements of a BPCF architecture such as a PDP and a PEP represented by some instances of policy control server 14 and gateway 8, respectively, of FIGS. 1A-1B. For instance, in the case of a TDF architecture (which may be applied in combination with a PCC architecture), rules 65 and rules 65' may represent ADC rules extended in accordance with techniques described herein.

Figure 7:
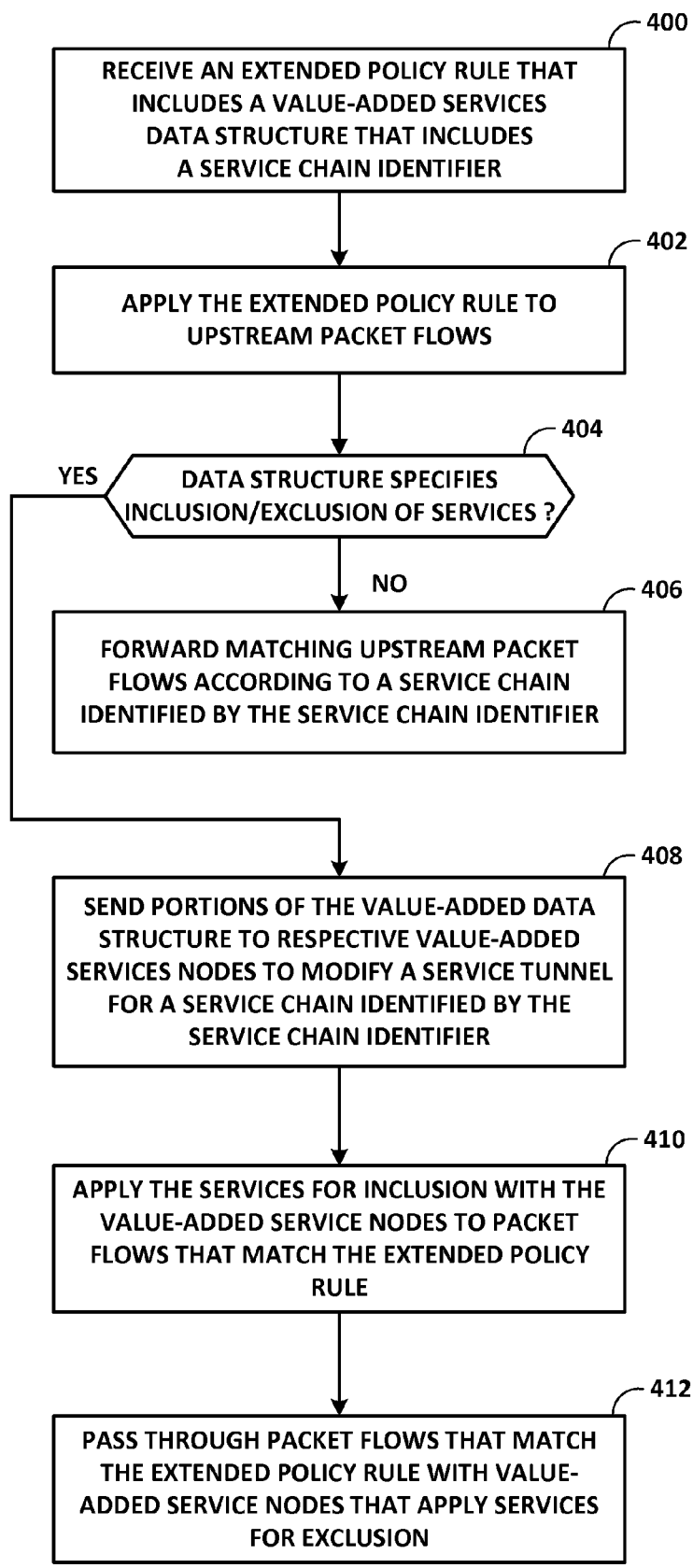
FIG. 7 is a flowchart illustrating an example mode of operation for a gateway that applies policy rules extended according to techniques described in this disclosure.

FIG. 7 is a flowchart illustrating an example mode of operation for a gateway that applies policy rules extended according to techniques described in this disclosure. The mode of operation is described for purposes of illustration with respect to gateway 8 of FIG. 1 and to extended policy rule 200 of FIG. 5. Policy enforcement module 18 of gateway 8 receives, from a policy control server 14, an extended policy rule 200 that includes a value-added services data structure 208 that includes a service chain identifier 209A that defines one or more value-added service nodes 10 to be applied in a particular order to provide a composite service for application to packet flows bound to the identified service chain (400). Subsequently, gateway 8 receives upstream packet flows, to which policy enforcement module 18 of applies the extended policy rule 200 (402). If the value-added services data structure 208 does not specify the inclusion or exclusion of value-added services nodes 10 other than what are defined by the service chain identified by the service chain identifier 209 (NO branch of 404), policy enforcement module 18 forwards packet flows that match the extended policy rule 200 using a service chain interface 27 for the service chain 28 identified by the service chain identifier 209A (406).

If the value-added services data structure 208 specifies the inclusion or exclusion of value-added services nodes 10 for tailoring the service chain for matching flows (YES branch of 404), policy enforcement module 18 provides at least portions of the value-added services data structure 208 to VAS nodes 10 (e.g., in-band or out-of-band) to modify the service tunnel for the service chain identified by the service chain identifier 209A (408). The VAS nodes 10 implement value-added services data structure 208 to modify the service tunnel. Specifically, VAS nodes 10 apply, to matching packet flows, services specified by include service identifiers 209B according to service data structure 210A-210N (410). If specified, a VAS node 10 passes through matching packet flows (i.e., do not apply the value-added service) when the VAS node 10 is listed for exclusion in exclude service identifiers 209C (412).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A method comprising:
    receiving, by a policy enforcement device for an access network by which a subscriber device accesses a packet data network, a policy rule that defines at least one of policy control and application detection by the policy enforcement device for the subscriber device, wherein the policy rule includes a service chain identifier that identifies a service chain that defines one or more value-added services to be applied in a particular order by one or more value-added service nodes external to the policy enforcement device and located on a service path for the service chain between the policy enforcement device and the packet data network to provide a composite service for application to packet flows associated to the service chain;
    receiving, by the policy enforcement device, a packet sourced by the subscriber device and destined to the packet data network;
    applying, by the policy enforcement device, the policy rule to the packet to associate the packet to the service chain identified by the service chain identifier; and
    forwarding, by the policy enforcement device and based at least on the association of the packet to the service chain identified by the service chain identifier, the packet to the one or more value-added service nodes.

2. The policy enforcement device of claim 1,
    wherein the policy rule comprises a value-added services data structure comprising:
    the service chain identifier; and
    terminal data that includes identifying information for packet flows associated with the policy rule, and wherein the policy enforcement module is configured to provide the terminal data to a terminal value-added services node of the service chain to enable, by the terminal value-added services node, binding of flows to the service chain in the downlink direction.

3. The method of claim 1,
wherein the policy rule comprises a Policy and Charging Control (PCC) rule that is extended to include the service chain identifier,
wherein receiving, by the policy enforcement device, the policy rule comprises receiving the PCC rule by a Policy Control and Enforcement Function (PCEF) of the policy enforcement device,
wherein applying, by the policy enforcement device, the policy rule to the packet comprises applying, by the PCEF, the PCC rule to the packet to associate the packet to the service chain identified by the service chain identifier.

4. The method of claim 1,
wherein the policy rule comprises an Application Detection and Control (ADC) rule that is extended to include the service chain identifier,
wherein receiving, by the policy enforcement device, the policy rule comprises receiving the ADC rule by a Traffic Detection Function (TDF) of the policy enforcement device,
wherein applying, by the policy enforcement device, the policy rule to the packet comprises applying, by the TDF, the ADC rule to the packet to associate the packet to the service chain identified by the service chain identifier.

5. The method of claim 1, wherein each of the one or more value-added services comprises one of Carrier-Grade Network Address Translation, firewall, load balancing, Transport Control Protocol (TCP) proxying, media content caching, and TCP optimization.

6. The method of claim 1,
wherein the policy rule includes a value-added services data structure comprising:
the service chain identifier; and
an include service identifier that specifies a value-added service to be included in the service chain identified by the service chain identifier, and
wherein the policy enforcement device provides at least portions of the value-added services data structure to the one or more value-added service nodes to modify a service tunnel for the service chain to include the value-added service specified by the include service identifier.

7. The method of claim 1,
wherein the policy rule includes a value-added services data structure comprising:
the service chain identifier; and
an exclude service identifier that specifies a value-added service to be excluded from the service chain identified by the service chain identifier, and
wherein the policy enforcement device provides at least portions of the value-added services data structure to the one or more value-added service nodes to modify a service tunnel for the service chain to exclude the value-added service specified by the exclude service identifier.

8. The method of claim 1,
wherein the policy rule comprises a value-added services data structure comprising:
the service chain identifier; and
terminal data that includes identifying information for packet flows associated with the policy rule, and
wherein the policy enforcement device provides the terminal data to a terminal value-added services node of the service chain to enable, by the terminal value-added services node, binding of flows to the service chain in the downlink direction.

9. A method comprising:
generating, by a policy control server, a policy rule that defines at least one of policy control and application detection by an access network for a subscriber device,
wherein the policy rule includes a service chain identifier that identifies a service chain that defines one or more value-added services to be applied in a particular order by one or more value-added service nodes external to the policy enforcement device and located on a service path for the service chain between the policy enforcement device and the packet data network to provide a composite service for application to packet flows associated to the service chain; and
sending the policy rule from the policy control server to a policy enforcement device for the access network.

10. The method of claim 9,
wherein the policy control server implements a Policy Control and Charging Rules Function (PCRF), and
wherein the policy rule comprises one of a Policy Control and Charging (PCC) rule for a PCC architecture and an Application Detection and Control (ADC) rule for a Traffic Detection Function architecture.

11. The method of claim 9,
wherein the policy rule includes a value-added services data structure comprising:
the service chain identifier; and
an include service identifier that specifies a value-added service to be included in the service chain identified by the service chain identifier,
wherein the policy enforcement device provides at least portions of the value-added services data structure to the one or more value-added service nodes to modify a service tunnel for the service chain to exclude the value-added service specified by the exclude service identifier.

12. The method of claim 9,
wherein the policy rule includes a value-added services data structure comprising:
the service chain identifier; and
an exclude service identifier that specifies a value-added service to be excluded from the service chain identified by the service chain identifier,
wherein the policy enforcement device provides at least portions of the value-added services data structure to the one or more value-added service nodes to modify a service tunnel for the service chain to exclude the value-added service specified by the exclude service identifier.

13. The method of claim 9,
wherein the policy rule comprises a value-added services data structure comprising:
the service chain identifier; and
terminal data that includes identifying information for packet flows associated with the policy rule, and
wherein the policy enforcement device provides the terminal data to a terminal value-added services node of the service chain to enable, by the terminal value-added services node, binding of flows to the service chain in the downlink direction.

14. A policy enforcement device for an access network that provides connectivity to a subscriber device to access a packet data network, the policy enforcement device comprising:
a control unit comprising a processor;

a policy enforcement module executed by the control unit and configured to receive a policy rule that defines at least one of policy control and application detection by the access network for the subscriber device, wherein the policy rule includes a service chain identifier that identifies a service chain that defines one or more value-added services to be applied in a particular order by one or more value-added service nodes external to the policy enforcement device and located on a service path for the service chain between the policy enforcement device and the packet data network to provide a composite service for application to packet flows associated to the service chain; and a network interface to receive a packet sourced by the subscriber device and destined to the packet data network, wherein the policy enforcement module is configured to apply the policy rule to the packet to associate the packet to the service chain identified by the service chain identifier, and wherein the policy enforcement device is configured to forward, based at least on the association of the packet to the service chain identified by the service chain identifier, the packet to the one or more value-added service nodes.

15. The policy enforcement device of claim 14, wherein the policy rule comprises a Policy and Charging Control (PCC) rule that is extended to include the service chain identifier, wherein the policy enforcement module comprises a Policy Control and Enforcement Function (PCEF) configured to receive the PCC rule, and wherein to apply the policy rule to the packet, the PCEF is configured to apply the PCC rule to the packet to associate the packet to the service chain identified by the service chain identifier.

16. The policy enforcement device of claim 14, wherein the policy rule comprises an Application Detection and Control (ADC) rule that is extended to include the service chain identifier, wherein the policy enforcement module comprises a Traffic Detection Function (TDF) configured to receive the ADC rule, wherein to apply the policy rule to the packet, the TDF is configured to apply the ADC rule to the packet to associate the packet to the service chain identified by the service chain identifier.

17. The policy enforcement device of claim 14, wherein the policy rule includes a value-added services data structure comprising:

the service chain identifier; and an include service identifier that specifies a value-added service to be included in the service chain identified by the service chain identifier, and wherein the policy enforcement module is configured to provide at least portions of the value-added services data structure to the one or more value-added service nodes to modify a service tunnel for the service chain to include the value-added service specified by the include service identifier.

18. The policy enforcement device of claim 14, wherein the policy rule includes a value-added services data structure comprising:

the service chain identifier; and an exclude service identifier that specifies a value-added service to be excluded from the service chain identified by the service chain identifier, and wherein the policy enforcement module is configured to provide at least portions of the value-added services data structure to the one or more value-added service nodes to modify a service tunnel for the service chain to exclude the value-added service specified by the exclude service identifier.

19. A policy control server comprising:

a control unit comprising a processor;

a rule module executed by the control unit and configured to generate, for a subscriber device, a policy rule that defines at least one of policy control and application detection by an access network for a subscriber device, wherein the access network provides connectivity for the subscriber device to access a packet data network, wherein the policy rule includes a service chain identifier that identifies a service chain that defines one or more value-added services to be applied in a particular order by one or more value-added service nodes external to the policy control server and located on a service path for the service chain between the policy enforcement device and the packet data network to provide a composite service for application to packet flows associated to the service chain;

a network interface card configured to send the policy rule to a gateway device of the access network.

* * * * *